United States Patent
Rope et al.

(10) Patent No.: US 12,407,657 B1
(45) Date of Patent: *Sep. 2, 2025

(54) IN-BAND DSP MANAGEMENT INTERFACE

(71) Applicant: MARVELL ASIA PTE LTD, Singapore (SG)

(72) Inventors: Todd Rope, Santa Clara, CA (US); Whay Sing Lee, Santa Clara, CA (US); Arash Farhoodfar, Santa Clara, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 234 days.

This patent is subject to a terminal disclaimer.

(21) Appl. No.: 18/190,562

(22) Filed: Mar. 27, 2023

Related U.S. Application Data

(63) Continuation of application No. 16/730,770, filed on Dec. 30, 2019, now Pat. No. 11,616,764.

(51) Int. Cl.
| | |
|---|---|
| *H04L 9/40* | (2022.01) |
| *G06F 8/61* | (2018.01) |
| *H04L 41/00* | (2022.01) |
| *H04L 41/14* | (2022.01) |
| *H04L 49/25* | (2022.01) |

(52) U.S. Cl.
CPC ............ *H04L 63/0428* (2013.01); *G06F 8/61* (2013.01); *H04L 41/14* (2013.01); *H04L 41/20* (2013.01); *H04L 49/25* (2013.01)

(58) Field of Classification Search
CPC ..... H04L 63/0428; H04L 41/14; H04L 41/20; H04L 49/25; G06F 8/61
See application file for complete search history.

(56) References Cited

U.S. PATENT DOCUMENTS

| | | | |
|---|---|---|---|
| 10,659,337 B2* | 5/2020 | Riani | H04L 43/0823 |
| 10,797,792 B1* | 10/2020 | Momtahan | H04B 10/0791 |
| 2004/0193985 A1* | 9/2004 | Bhora | G01R 31/3187 |
| | | | 714/733 |
| 2009/0238263 A1 | 9/2009 | Jaggi et al. | |
| 2012/0093149 A1 | 4/2012 | Blair et al. | |
| 2012/0271379 A1* | 10/2012 | Assche | A61N 1/37211 |
| | | | 340/9.1 |
| 2014/0237323 A1* | 8/2014 | Yu | H04L 1/0047 |
| | | | 714/776 |

(Continued)

FOREIGN PATENT DOCUMENTS

KR  2008052166  6/2008

*Primary Examiner* — Brian J. Gillis
*Assistant Examiner* — Juan C Turriate Gastulo

(57) ABSTRACT

In an optical communication system, a high-speed data interface to an optical module can be configured from the module's host-side interface and line-side interface. These module interfaces can be configured with an integrated digital signal processor (DSP) having a DSP microcontroller unit (MCU) as a high-speed in-band DSP management interface. The DSP MCU can communicate to either a host MCU in a host switch/router via the host-side interface or to an external device through the optics hardware via the line-side interface. The present invention provides for systems, devices, and methods using this interface for numerous module DSP-related applications, such as firmware upgrades, management data, diagnostic/telemetry streaming, encryption key programming, and the like.

13 Claims, 19 Drawing Sheets

(56) References Cited

U.S. PATENT DOCUMENTS

| | | |
|---|---|---|
| 2017/0142503 A1 | 5/2017 | Takei |
| 2017/0146973 A1* | 5/2017 | Hada ................. G05B 19/4147 |
| 2021/0058343 A1 | 2/2021 | Greth et al. |
| 2021/0117179 A1* | 4/2021 | Park .......................... G06F 8/65 |

* cited by examiner

| Byte Numbers | Field Name | Description |
|---|---|---|
| 0-5 | DMAC | Destination MAC Address |
| 6-11 | SMAC | Source MAC Address |
| 12-13 | EtherType | Proprietary EtherType compatible with 802.3 |
| 14-<max packet size> | Datagram | Datagram content |

FIG. 6

| Byte Numbers | Field Name | Description |
| --- | --- | --- |
| 0-3 | SEQ | Incrementing sequence number |
| 4 | TYPE | Fixed value of 1 (Write Request) |
| 5 | BANK | Bank number from CMIS |
| 6 | PAGE | Page number from CMIS |
| 7 | ADDR | Register address number from CMIS |
| 8-9 | DATALEN | Number of bytes to be written, up to 2048 in this example, assuming Jumbo packets are supported |
| 10-<DATALEN+9> | DATA | Data to be written to DSP |

FIG. 7A

| Byte Numbers | Field Name | Description |
|---|---|---|
| 0-3 | SEQ | Sequence number from Write Request Datagram |
| 4 | TYPE | Fixed value of 2 (Write Respose) |
| 5 | RESP | Response code<br>00=data was written successfully<br>01=Out of sequence detected<br>02-FF=other error code |

FIG. 7B

| Byte Numbers | Field Name | Description |
|---|---|---|
| 0-3 | SEQ | Incrementing sequence number. |
| 4 | TYPE | Fixed value of 3 (Read Request) |
| 5 | BANK | Bank number from CMIS |
| 6 | PAGE | Page number from CMIS |
| 7 | ADDR | Register address number from CMIS |
| 8-9 | LENGTH | Number of bytes to be read, up to 2048 in this example, assuming Jumbo packets are supported |

FIG. 7C

| Byte Numbers | Field Name | Description |
|---|---|---|
| 0-3 | SEQ | Sequence number from Read Request Datagram |
| 4 | TYPE | Fixed value of 4 (Read Response) |
| 5 | RESP | Response code<br>00=data was read successfully<br>01=Out of sequence detected<br>02-FF=other error code |
| 6-7 | RSVD | Unused |
| 8-9 | DATALEN | Number of bytes being sent to host from DSP (copied from Read Request) |
| 10-<DATALEN+9> | DATA | Data from DSP |

| Byte Numbers | Field Name | Description |
| --- | --- | --- |
| 0-3 | SEQ | Incrementing sequence number. |
| 4 | TYPE | Fixed value of 5 (Command Request) |
| 5 | RSVD | Unused |
| 6-7 | CMD | Command Code (See Table 9-1 in CMIS) |
| 8-9 | DATALEN | Length of data sent to DSP (defined in CMIS per command code) |
| 10-<DATALEN+9> | DATA | Data sent to DSP as part of command |

FIG. 7E

| Byte Numbers | Field Name | Description |
|---|---|---|
| 0-3 | SEQ | Sequence number from Command Request Datagram |
| 4 | TYPE | Fixed value of 6 (Command Response) |
| 5 | STS | Command Status Code (see Table 8-10 in CMIS 4.0) |
| 6-7 | RSVD | Unused |
| 8-9 | DATALEN | Number of bytes sent from DSP to host |
| 10-<DATALEN+9> | DATA | Data sent from DSP to host as part of Command response (defined in CMIS per command code in corresponding Command Request Datagram) |

FIG. 7F

| Byte Numbers | Field Name | Description |
|---|---|---|
| 0-3 | SEQ | Sequence number from most recent control datagram |
| 4 | TYPE | Fixed value of 8 (Diagnostic Stream) |
| 5 | RSVD | Unused |
| 6-7 | REQTYPE | Request type currently being transmitted (from most recent control datagram) |
| 8-11 | SSEQ | Sub-sequence number (incrementing sequence number within a block) |
| 12-13 | DATALEN | Number of bytes in this packet |
| 14-<DATALEN+13> | DATA | Data sent from DSP to host; data depends on request code |

FIG. 8B

| Byte Numbers | Field Name | Description |
|---|---|---|
| 0-3 | SEQ | Incrementing sequence number. |
| 4 | TYPE | Fixed value of 5 (Command Request) |
| 5 | RSVD | Unused |
| 6-7 | CMD | 0x8000 (Key Setup Command; Reserved in CMIS) |
| 8-9 | DATALEN | 36 |
| 10-11 | START_IDX | 0 (index into client table) |
| 12-13 | NUM_IDX | 1 (number of KEYs in this datagram) |
| 14-45 | KEY | 32 byte key data |

FIG. 9A

| Byte Numbers | Field Name | Description |
|---|---|---|
| 0-3 | SEQ | Sequence number from Command Request Datagram |
| 4 | TYPE | Fixed value of 6 (Command Response) |
| 5 | STS | 0 (Command Status Code = Success) |
| 6-7 | RSVD | Unused |
| 8-9 | DATALEN | 0 |

FIG. 9B

| Byte Numbers | Field Name | Description |
|---|---|---|
| 0-3 | SEQ | Incrementing sequence number. |
| 4 | TYPE | Fixed value of 5 (Command Request) |
| 5 | RSVD | Unused |
| 6-7 | CMD | 0x8001 (Statistics Read Request Command; Reserved in CMIS) |
| 8-9 | DATALEN | 4 |
| 10-11 | START_IDX | 0 (index into client table) |
| 12-13 | NUM_IDX | 1 (number of clients to retrieve in response datagram) |

FIG. 9C

| Byte Numbers | Field Name | Description |
|---|---|---|
| 0-3 | SEQ | Sequence number from Command Request Datagram |
| 4 | TYPE | Fixed value of 6 (Command Response) |
| 5 | STS | 0 (Command Status Code = Success) |
| 6-7 | RSVD | Unused |
| 8-9 | DATALEN | <total number of bytes> |
| 10-13 | IDX0_EncryptedPackets | Total number of packets transmitted encrypted out of client 0 |
| 14-17 | IDX0_ProtectedPackets | Total number of packets transmitted protected out of client 0 |
| 18-21 | IDX0_UnencryptedPackets | Total number of packets transmitted unencrypted out of client 0 |
| ... | | Other statistics |

FIG. 9D

IN-BAND DSP MANAGEMENT INTERFACE

CROSS-REFERENCE TO RELATED APPLICATIONS

The present disclosure is a continuation of U.S. patent application Ser. No. 16/730,770 filed on Mar. 28, 2023. The entire disclosure of the application referenced above is incorporated herein by reference.

BACKGROUND OF THE INVENTION

The present invention generally relates to communication systems and integrated circuit (IC) devices. More specifically, the present invention provides for an in-band digital signal processor (DSP) management interface.

Over the last few decades, the use of communication networks has exploded. In the early days of the Internet, popular applications were limited to emails, bulletin boards, and mostly informational and text-based web page surfing. The amount of data transferred by such applications was relatively small. Today, the Internet and mobile applications demand a huge amount of bandwidth for transferring photo, video, music, and other multimedia files. For example, a social networking platform can process more than 500 TB of data daily. With such high demands on data storage and data transfer, existing data communication systems need to be improved to address these needs.

Optical communication systems are widely used to address the need for high-speed data transfer. However, as optical modules become more complex, more firmware is needed to provide for module features, and more complex feature sets continue to be developed. The currently available interfaces for module/DSP management are not designed for high-speed data communications. Furthermore, conventional interfaces require tunneling infrastructure through the module microcontroller to access the DSP, which increases complexity and degrades the transfer speeds.

There have been many conventional types of methods and systems for a DSP management interface. Unfortunately, they have been inadequate to address the growing need for high-speed data transfer. Therefore, improved communication systems and methods for DSP management are highly desired.

BRIEF SUMMARY OF THE INVENTION

The present invention generally relates to communication systems and integrated circuit (IC) devices. More specifically, the present invention provides for an in-band digital signal processor (DSP) management interface. Merely by way of example, the present invention is applied to an optical communication system. However, the present invention has a much broader range of applicability, such as other cabling systems, wireless systems, baseband systems, and the like.

In an example, the present invention provides a communication system configured with a high-speed in-band DSP management interface. The system can include a host device and a module device. The host device can include a host microcontroller unit (MCU) coupled to a switch device. The module device can include an integrated digital signal processor (DSP) coupled to a communication device. This integrated DSP includes a DSP coupled to a DSP MCU. The module device also includes a module host-side interface and a module line-side interface, which are configured as a high-speed in-band DSP management interface to the integrated DSP. The DSP MCU is configured to communicate with the host MCU through the switch device using the module host-side interface. And, the communication device is configured to communicate via a communication channel using the module line-side interface.

In a specific example, the host device is a host switch or host router and the switch device is a switch application specific integrated circuit (ASIC). The communication device can include an optics device, a wireless device, a baseband device, a transceiver device, or the like. Also, the integrated DSP can include a MAC client configured to the high-speed in-band DSP management interface.

In a specific example, the host MCU is configured to send a firmware image to the integrated DSP using the module host-side interface. And, the DSP MCU is configured to install the firmware image in the module device. Also, the DSP MCU and the host MCU can be configured to communicate using the module host-side interface for management data, encryption key setup, encryption statistics, or the like.

In a specific example, the DSP includes a decoder coupled to an elastic FIFO coupled to an encoder. The DSP MCU is configured to extract one or more data packets from the decoder or inject one or more data packets to the encoder. Also, the DSP includes a capture engine coupled to the DSP MCU and configured to exchange diagnostic information. In a specific example, the DSP MCU is configured to communicate diagnostic information to a diagnostics platform over the communication channel with the communication device using the module line-side interface. Those of ordinary skill in the art will recognize other variations, modifications, and alternatives to the system above.

In an example, the present invention provides for a method of operating a communication system for host-to-DSP packet movement. The method includes sending, by a host MCU within a host device, one or more first data packets to a switch device within the host device. The one or more first data packets can be characterized by a datagram. The method also includes sending, by the switch device, the one or more first data packets to a DSP of an integrated DSP within a module device over a high-speed in-band DSP management interface. This interface is configured from a module host-side interface and a module line-side interface of the module device. Further, the method includes sending, by the DSP, the one or more first data packets to a DSP MCU of the integrated DSP.

The method can further include receiving, by the switch device, one or more second data packets from at least a port within the host device. The method can also include sending, by the switch device, the one or more second data packet to the DSP of the integrated DSP over the high-speed in-band DSP management interface. And, the method can include sending, by the DSP, the one or more second data packets to a communication device of the module device. Further, the method can include sending, by the communication device, the second plurality of data packets to a remote destination via a communication channel. In a specific example, the switch device interleaves the one or more first data packets and the one or more second data packets.

In an example, the present invention can provide a method of operating a communication system for DSP-to-host packet movement, which can be configured with the host-to-DSP packet movement method above. The method can include sending, by the DSP MCU of an integrated DSP within the module device, one or more first data packets to a DSP of the integrated DSP. These one or more first data packets can be characterized by a datagram. Also, the method can include sending, by the DSP, the one or more first data packets to the switch device within the host device over the high-speed in-band DSP management interface. Further, the method can include sending, by the switch device, the one or more first data packets to the host MCU within the host device.

The method can further include receiving, by the communication device within the module device, one or more second data packets from a remote destination via a communication channel. The method can also include sending, by the communication device, the one or more second data packets to the DSP of the integrated DSP. Also, the method can include sending, by the DSP, the one or more data packets to the switch device within the host device over the high-speed in-band DSP management interface. Further, the method can include sending, by the switch device, the one or more second data packets to at least a port within the host device. In a specific example, the DSP can interleave the one or more first data packets and the one or more second data packets.

In specific examples of the methods above, at least one of the one or more first data packets and the one or more second data packets can be encapsulated using an Ethernet framing, TCP/IP framing, an SSH protocol, or the like. Or, at least one of these can include a security layer, such as MAC address obfuscation, CRC calculation obfuscation, or the like. Also, the datagram can include one of the following: a write request datagram, a write response datagram, a read request datagram, a read response datagram, a command request datagram, a command response datagram, an encryption key setup request datagram, an encryption key setup response datagram, an encryption status read request datagram, an encryption status read response datagram, or the like. Those of ordinary skill in the art will recognize other variations, modifications, and alternatives to the methods above.

In an example, the present invention provides a method for operating a communication system for diagnostic streaming. The method includes sending, by the DSP MCU, one or more first data packets to the DSP. The method also includes sending, by the DSP, the one or more first data packets to the communication device using the high-speed in-band DSP management interface configured from a module line-side interface of the module device. Further, the method includes sending, by the communication device, the one or more first data packets to a diagnostics platform over the communication channel. In a specific example, the one or more first data packets are characterized by a diagnostic stream datagram.

In a specific example, sending the one or more first data packets to the diagnostics platform includes sending, by the communication device, the one or more first data packets to a diagnostics communication device of the diagnostics platform. This step also includes sending, by the diagnostics communication device, the one or more first data packets to a diagnostics DSP of the diagnostics platform. Also, this step includes sending, by the diagnostics DSP, the one or more first data packets to a diagnostics field programmable gate array (FPGA) of the diagnostics platform, the diagnostics FPGA being configured by a diagnostics software. Further, this step includes sending, by the diagnostics FPGA, the one or more first data packets to a computing device running a diagnostics software.

The method can further include receiving, by the communication device, one or more second data packets from the diagnostics platform over the communication channel. In a specific example, the one or more second data packets from the diagnostics platform are characterized by diagnostic control datagram. The method can also include sending, by the communication device, the one or more second data packets to the DSP using the high-speed in-band DSP management interface. Further, the method can include sending, by the DSP, the one or more second data packets to the DSP MCU.

In a specific example, receiving the one or more second data packets from the diagnostics platform includes sending, by the computing device running the diagnostics software, the one or more second data packets to the diagnostics FPGA. This step also includes sending, by the diagnostics FPGA, the one or more second data packets to the diagnostics DSP. Also, this step includes sending, by the diagnostics DSP, the one or more second data packets to the diagnostics communication device. Further, this step includes sending, by the diagnostics communication device, the one or more second data packets to the communication device of the module device over the communication channel. Of course, there can be variations, modifications, and alternatives.

Many benefits are recognized through various embodiments of the present invention. Such benefits include a system/device architecture and method of operation for the improved high-speed in-band data interface for DSP management. This high-speed in-band data interface can be used for firmware upgrades, management data, diagnostic/telemetry streaming, encryption key programming, and other applications as well.

The present invention achieves these benefits and others in the context of known data transmission and optically amplified technologies. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 6 is a table representing an Ethernet-II packet encapsulation according to an example of the present invention.

FIGS. 7A and 7B are tables representing a write request datagram and a write response datagram, respectively, according to examples of the present invention.

FIGS. 7C and 7D are tables representing a read request datagram and a read response datagram, respectively, according to examples of the present invention.

FIGS. 7E and 7F are tables representing a command request datagram and a command response datagram, respectively, according to examples of the present invention.

FIG. 8B is a table representing a diagnostic stream datagram according to an example of the present invention.

FIGS. 9A and 9B are tables representing a key setup request datagram and a key setup response datagram, respectively, according to examples of the present invention.

FIGS. 9C and 9D are tables representing a statistics read request datagram and a statistics read response datagram, respectively, according to examples of the present invention.

DETAILED DESCRIPTION OF THE INVENTION

Figure 1:
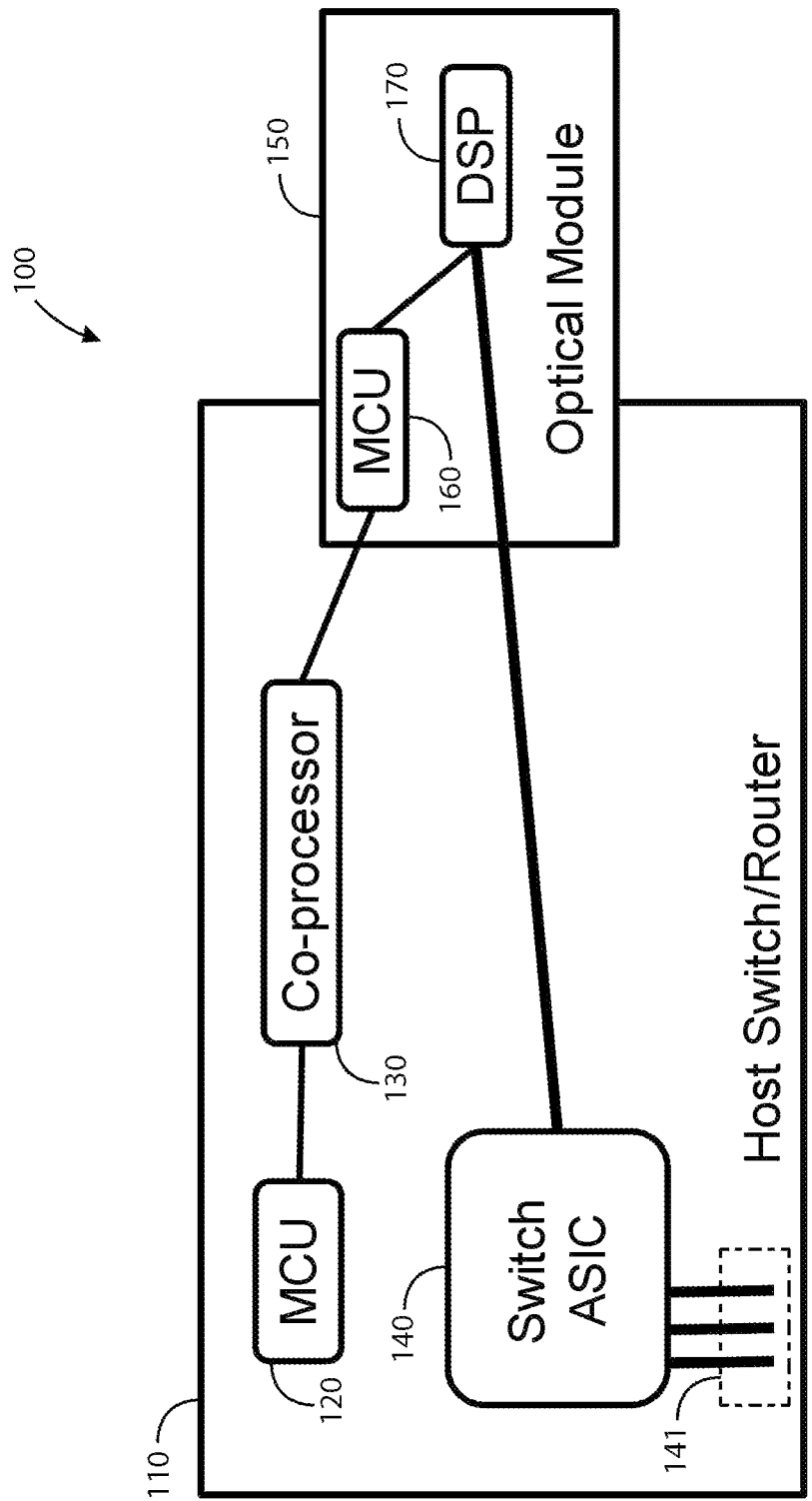
FIG. 1 is a simplified block diagram illustrating a conventional architecture for an optical communication system.

The present invention generally relates to communication systems and integrated circuit (IC) devices. More specifically, the present invention provides for an in-band digital signal processor (DSP) management interface. Merely by way of example, the present invention is applied to an optical communication system. However, the present invention has a much broader range of applicability, such as other cabling systems, wireless systems, baseband systems, and the like.

As explained above, optical modules are becoming increasingly complex and are requiring more firmware to provide for increasingly complex feature sets. The currently available interfaces for module/DSP management are not designed for high speed data communications. For example, MDIO 4 MHz provides about a 1 Mbps maximum throughput, and I2C 1 MHz provides about a 500 Kbps maximum throughput. Conventional interfaces also require tunneling infrastructure through the module microcontroller to access the DSP, which increases complexity and degrades the above-mentioned speeds. Other management interfaces have been proposed (e.g., I3C (10-20 MHz), SGMII Ethernet-like, etc.), but such interfaces tend to add additional complexity or have other tradeoffs.

However, a high-speed data interface to the optical module can be configured from the module host and line interface (i.e., an in-band module interface). In an example, the present invention provides for systems, devices, and methods using such a high-speed in-band interface for numerous module DSP-related applications.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified block diagram illustrating a conventional architecture for an optical communication system. As shown, the conventional optical communication system 100 includes a host switch/router 110 coupled to an optical module 150. The host switch/router 110 includes a host microcontroller unit (MCU) 120, a management coprocessor 130, and a switch application specific integrated circuit (ASIC) 140. The optical module 150 includes a module MCU 160 coupled to a DSP 170. The module MCU 160 is also coupled to the management coprocessor 130, which is coupled to the host MCU 120. And, the DSP 170 is coupled to the switch ASIC 140, which has other connections to other components of host switch/router 110, shown by region 141. The data path through the host MCU 120, the management coprocessor 130, the module MCU 160, and the DSP 170 is characterized by a management data flow, while the data path through the switch ASIC 140 to the DSP 170 is characterized by a high-speed data flow (shown by the thicker connection line).

In this conventional example, the module MCU 160 is separate from the DSP 170. The module MCU 160 handles firmware upgrades for the optical module 150, and the host MCU 120 communicates with the module MCU 160 using a low-speed management interface (e.g., I2C or MDIO). Here, the high-speed data path is not used for any management purpose. Further, there is no access from the line side (i.e., from the optical module 150).

Figure 2:
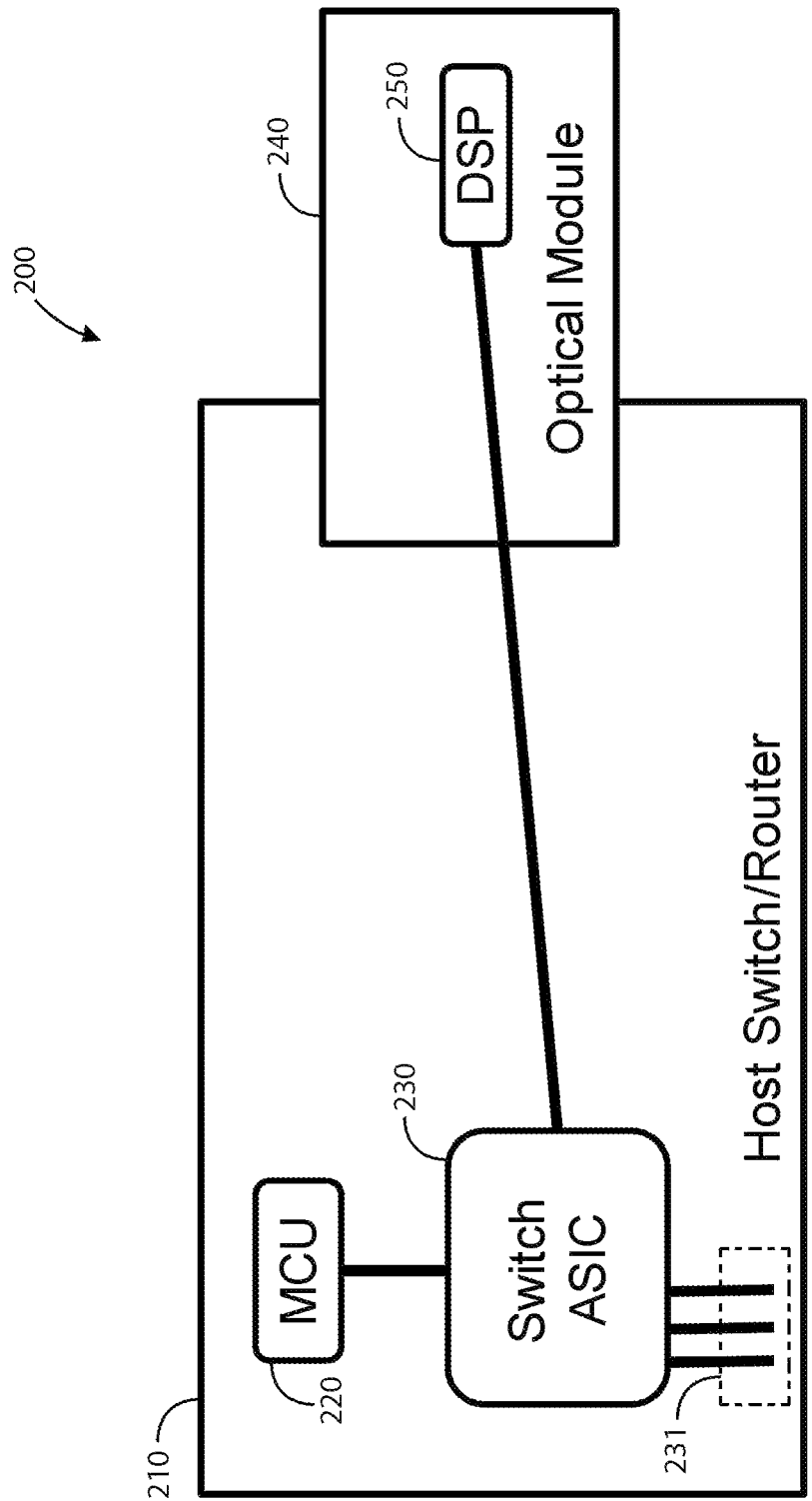
FIG. 2 is a simplified block diagram illustrating a host-side access architecture for an optical communication system according to an example of the present invention.

FIG. 2 is a simplified block diagram illustrating a host-side access architecture for an optical communication system according to an example of the present invention. As shown, the optical communication system 200 also includes a host switch/router 210 coupled to an optical module 240. The host/switch router 210 includes a host MCU 220 coupled to a switch ASIC 230. The optical module 240 includes an integrated DSP 250 that is coupled to the switch ASIC 230, which has other connections to other components of host switch/router 210, shown by region 231. Here, the data paths from through the switch ASIC 230 to the host MCU 220 and to the integrated DSP 250 are both characterized by a high speed and management data flow (shown by uniform thickness of connection lines), rather than the separate high-speed data flow and management data flow of the conventional architecture.

In this example, the module MCU is integrated into the DSP 250. The integrated MCU, referred to as the DSP MCU, handles firmware upgrades and/or diagnostics. The host MCU 220 communicates with the DSP MCU using a high-speed data path (e.g., 100G Ethernet, or the like) and ensures that sufficient bandwidth is available. In a specific example, the DSP 250 includes a Media Access Control (MAC) client configured on the data path to detect packets with MAC addresses bound for the DSP 250. Further, the MAC client can be configured to perform cyclic redundancy check (CRC) functions on such packets, direct them to the DSP MCU, or inject response packets into the data path. Those of ordinary skill in the art will recognize other variations, modifications, and alternatives.

In an example, the system 200 can be configured in a "mission mode", in which normal traffic is operational. Further details of the "mission mode" configuration are discussed with reference to FIGS. 5A and 5B. In a specific example, a pause methodology (e.g., Ethernet Pause or the like) can also be used for flow control. A pause symbol or packet can be inserted into the data path to stop traffic when the flow from one direction exceeds capacity (e.g., of the internal buffers of a host device, a module, external device, etc.). When capacity is available again, an un-pause symbol or packet can be inserted into the data path to resume the traffic flow again. Of course, there can be other variations modifications, and alternatives.

Figure 3:
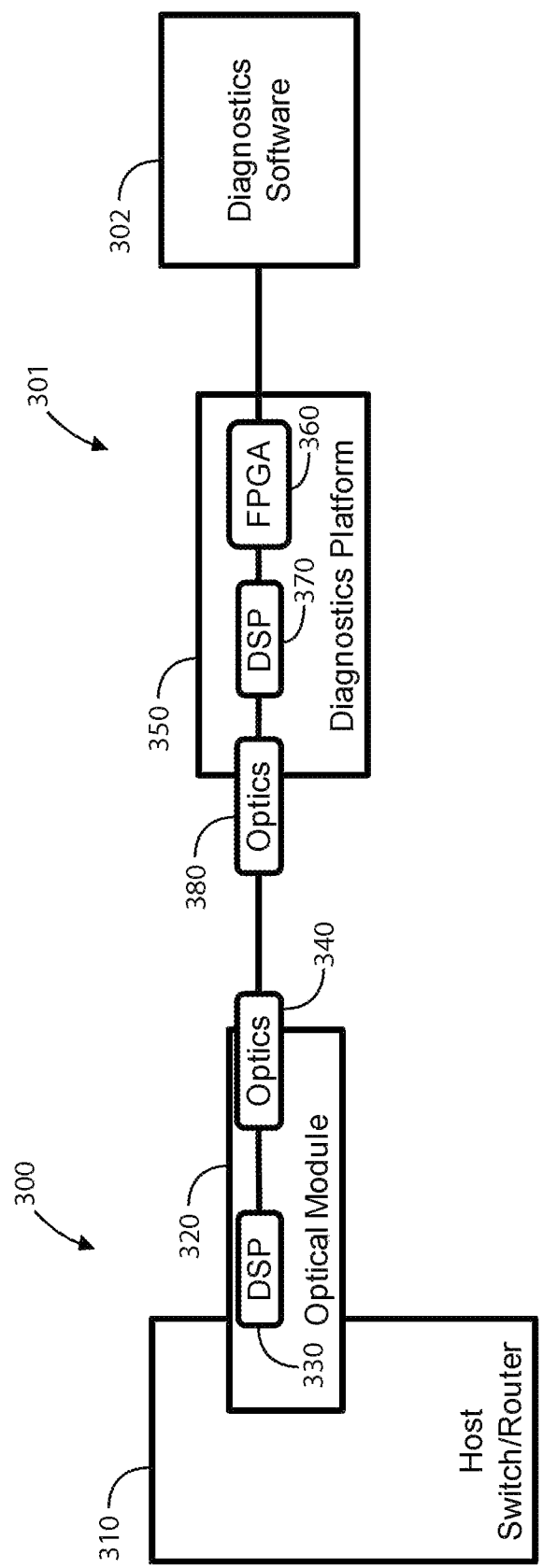
FIG. 3 is a simplified block diagram illustrating a line-side access architecture for an optical communication system according to an example of the present invention.

FIG. 3 is a simplified block diagram illustrating a line-side access architecture for an optical communication system according to an example of the present invention. As shown, the optical communication system 300 includes a host switch/router 310 and an optical module 320, which can be configured similarly to system 200 of FIG. 2. Similar to system 200, the optical module 320 includes an integrated DSP 330. Here, the integrated DSP 330 is coupled to an optics device 340, which provides a line-side interface.

In an example, the line-side interface can be used for diagnostic testing. As shown, a diagnostics system 301 can include a diagnostics platform 350 with a field-programmable gate array (FPGA) 360 coupled to an integrated diagnostic DSP 370, which is coupled to a diagnostic optics device 380. The FPGA 360 provides the interface between the integrated diagnostic DSP 370 and the diagnostic software 302, which can be running on a computer or other like computing device.

The diagnostics system 301 can be configured to the optical communication system 300 from the line-side through optical module 320. More specifically, the diagnostic optics device 380 can be coupled to the optics device 340 of the optics module 320 via the line-side interface. Using this interface, the DSP MCUs of integrated DSPs 330, 370 can communicate diagnostic information and the integrated DSPs 330, 370 can control the traffic flow between the DSP MCUs through the optics devices 340, 380. Further, unlike the conventional architecture, the data path through the optical module 320 to the diagnostics platform 301 and the computing system running the diagnostics software 302 is characterized by a high speed and management data flow.

In an example, the optical communication system can be configured in a "take-over" mode, in which normal traffic is not operational. As applied to the optical communication system 300 in FIG. 3, the interface between the integrated DSP 330 and the optics device 340 (i.e., DSP to line interface) can be taken out of "mission" mode for diagnos-tic/telemetry streaming. Further details for such streaming telemetry datagrams are discussed in reference to FIGS. 8A and 8B.

Figure 4:
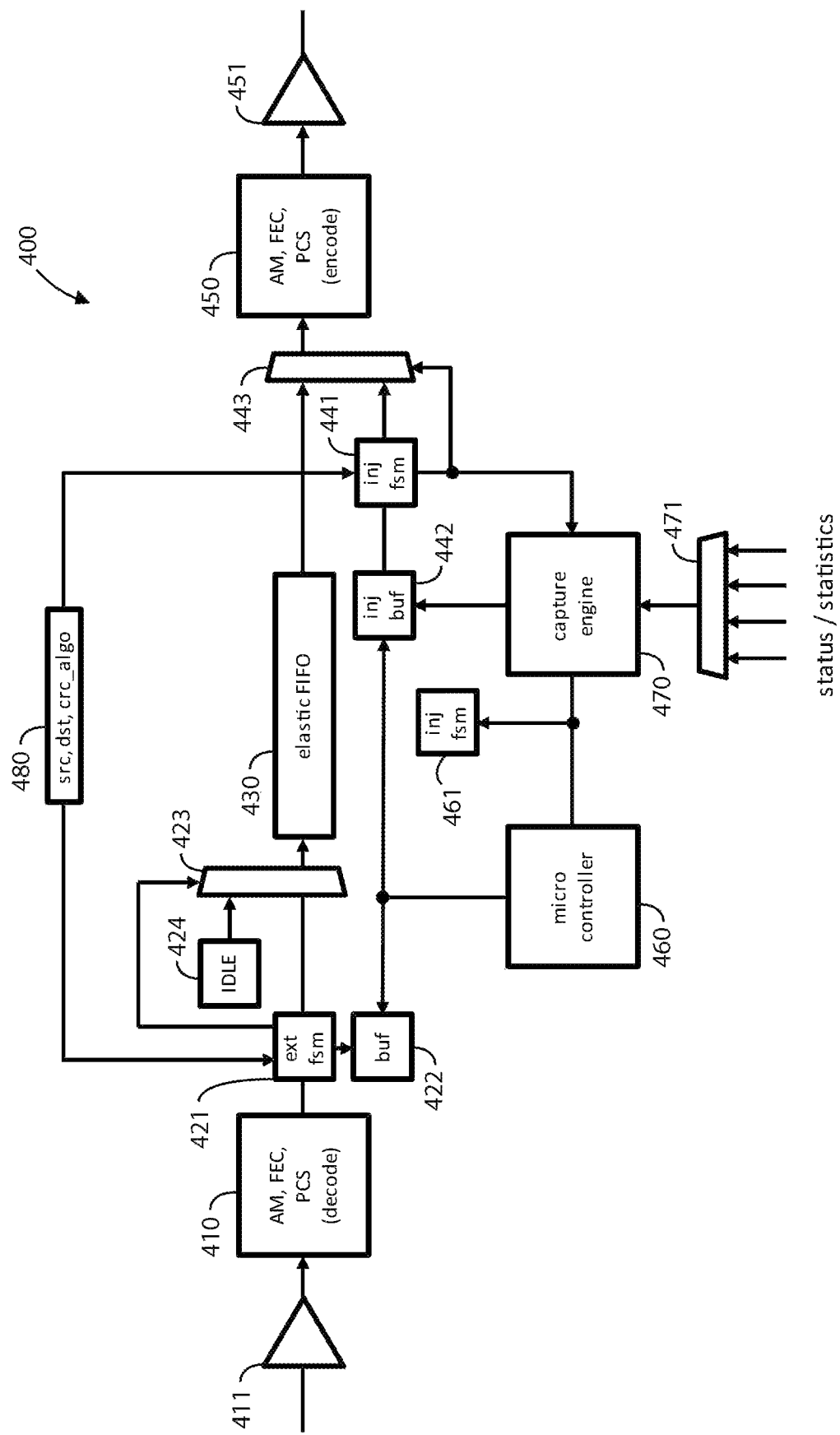
FIG. 4 is a simplified circuit block diagram illustrating an integrated DSP according to an example of the present invention.

FIG. 4 is a simplified circuit block diagram illustrating an integrated DSP according to an example of the present invention. As shown, the integrated DSP 400 includes at least a decoder 410, an elastic FIFO 430, a microcontroller 440 (i.e., DSP MCU), an encoder 450, and a capture engine 470. As discussed previously, the microcontroller is separated from the DSP in conventional module embodiments, but the present invention integrates the microcontroller 440 with the DSP to implement an in-band DSP management interface. In an example, the integrated DSP 400 parses incoming traffic (ingress path) through the decoder 410, determines data packets to be intercepted or redirected, and passes along the remaining packets along through the encoder 450 (egress path). Understanding that there can be variations, modifications, and alternatives to the configuration of the integrated DSP 400, the present example is discussed in greater detail below.

In an example, the input of decoder 410 is coupled a signal receiver 411 and the output of decoder 410 is coupled to a first finite state machine (FSM) circuit 421, which is coupled to a first buffer 422 and to a first multiplexor (MUX). In a specific example, the signal receiver 411 can be a Serializer/Deserializer (SERDES) receiver, or the like. In other examples, the signal receiver 411 can include any circuit elements or configurations known by those of ordinary skill in the art for the input data path, data buffering, bus transferring, and the like. Here, the signal receiver 411 is connected to the ingress data path to the integrated DSP 400, and the decoder 410 decodes the incoming traffic from the ingress path. Depending on the implementation, the decoder 410 can also include various functionalities, such as PCS ingress processing, symbol decoding, AM decoding, FEC decoding, and the like.

In a specific example, the first FSM circuit 421 is configured as a frame extraction machine, which can perform MAC address matching, redirect certain packets based on a selected criteria, and perform other similar functions. Packets extracted or redirected by the frame extraction machine are sent to the first buffer 422. The first FSM circuit 421 is coupled to both the control of the first MUX 423 and an input of the first MUX 423. In a specific example, the first MUX 423 is controlled by the first FSM circuit 421 to handle idle insertion into the data flow. An idle circuit 424 coupled to one of the inputs of the first MUX 423 to generate idle packets to replace any extracted packets. The first MUX 423 outputs to the elastic FIFO 430, which is configured for buffering the input data flow to the output data flow.

On the end, the output of encoder 450 is coupled to a signal transmitter 451 and the input of encoder 450 is coupled to the output of a second MUX 443. In a specific example, the signal transmitter 451 can be a SERDES transmitter, or the like. In other examples, the signal transmitter 451 can include any circuit elements or configurations known by those of ordinary skill in the art for the output data path, data buffering, bus transferring, and the like. Here, the signal transmitter 451 is coupled to the egress data path from the DSP 400, and the encoder 450 encodes outgoing traffic to the egress path. As discussed for decoder 410, the encoder 450 can also include various functionalities dependent upon implementation. Such functionalities can include PCS egress processing, symbol encoding, AM encoding, FEC encoding, and the like.

A second FSM circuit 441 is coupled to both the control of the second MUX 423 and an input of the second MUX 423. In a specific example, this second FSM circuit 441 is configured as a frame injection machine for diagnostic telemetry (e.g., injecting packets related to the datagrams shown in FIGS. 8A and 8B). A second buffer 442 is coupled to the second FSM circuit 441 to allow for high-speed frame injection. With the second buffer 442, this frame injection machine can be used for high-speed diagnostics, such as in the "take-over" mode discussed previously.

Also, the second MUX 443 is coupled to the elastic FIFO 430 such that the output of the elastic FIFO 430 is received as an input of the second MUX 443. In a specific example, the second MUX 443 is configured as a frame insertion/pass-thru MUX, allowing the output data flow from the FIFO 430 to pass through until frame injection machine injects frames for diagnostics. Further, a control circuit 480 is coupled to the first FSM circuit 421 and the second FSM circuit 441. In a specific example, this control circuit 480 can be configured as a MAC processing engine, which performs CRC generation and checking functions and the like.

The microcontroller 460 (i.e., DSP MCU) is coupled to the first buffer 422 (e.g., frame extraction buffer) and the second buffer 442 (e.g., frame injection buffer). And, both the microcontroller 460 and the capture engine 470 are coupled to a third FSM circuit 461. In a specific example, the third FSM 61 is configured as a frame injection machine for management information, such as from the DSP MCU in the "mission" mode discussed previously.

The diagnostic capture engine 450 is configured to receive diagnostic information (e.g., status and statistics) regarding various areas of the DSP 400 reported at high-speed. In a specific example, the capture engine 450 collects and formulates the high-speed packets for the frame injection buffer 422/frame injection machine 441. A capture engine MUX 451 is coupled to the capture engine 450 and configured to select among a plurality of diagnostic sources within the DSP 400.

FIG. 4 shows a simplified circuit block diagram managing one direction of traffic flow to the integrated DSP 400. This diagram can represent the DSP hardware configured to manage host-to-line traffic (i.e., the "TX" path) or line-to-host traffic (i.e., the "RX" path). Typically, an optical module carries traffic bidirectionally, addressing both the "TX" and "RX" paths. Thus, the present integrated DSP can be expanded to additionally include similarly structured hardware to manage the opposite path as well. Of course, those of ordinary skill in the art will recognize other variations, modifications, and alternatives.

In an example, the present invention provides a communication system configured with a high-speed in-band DSP management interface. The system can include a host device and a module device. The host device can include a host microcontroller unit (MCU) coupled to a switch device. The module device can include an integrated digital signal processor (DSP) coupled to a communication device. This integrated DSP includes a DSP coupled to a DSP MCU. The module device also includes a module host-side interface and a module line-side interface, which are configured as a high-speed in-band DSP management interface to the integrated DSP. The DSP MCU is configured to communicate with the host MCU through the switch device using the module host-side interface. And, the communication device is configured to communicate via a communication channel using the module line-side interface.

In a specific example, the host device is a host switch or host router and the switch device is a switch application specific integrated circuit (ASIC). The communication device can include an optics device, a wireless device, a baseband device, a transceiver device, or the like. Also, the integrated DSP can include a MAC client configured to the high-speed in-band DSP management interface.

In a specific example, the host MCU is configured to send a firmware image to the integrated DSP using the module host-side interface. And, the DSP MCU is configured to install the firmware image in the module device. Also, the DSP MCU and the host MCU can be configured to communicate using the module host-side interface for management data, encryption key setup, encryption statistics, or the like.

In a specific example, the DSP includes a decoder coupled to an elastic FIFO coupled to an encoder. The DSP MCU is configured to extract one or more data packets from the decoder or inject one or more data packets to the encoder. Also, the DSP includes a capture engine coupled to the DSP MCU and configured to exchange diagnostic information. In a specific example, the DSP MCU is configured to communicate diagnostic information to a diagnostics platform over the communication channel with the communication device using the module line-side interface. Those of ordinary skill in the art will recognize other variations, modifications, and alternatives to the system above.

Figure 5A:
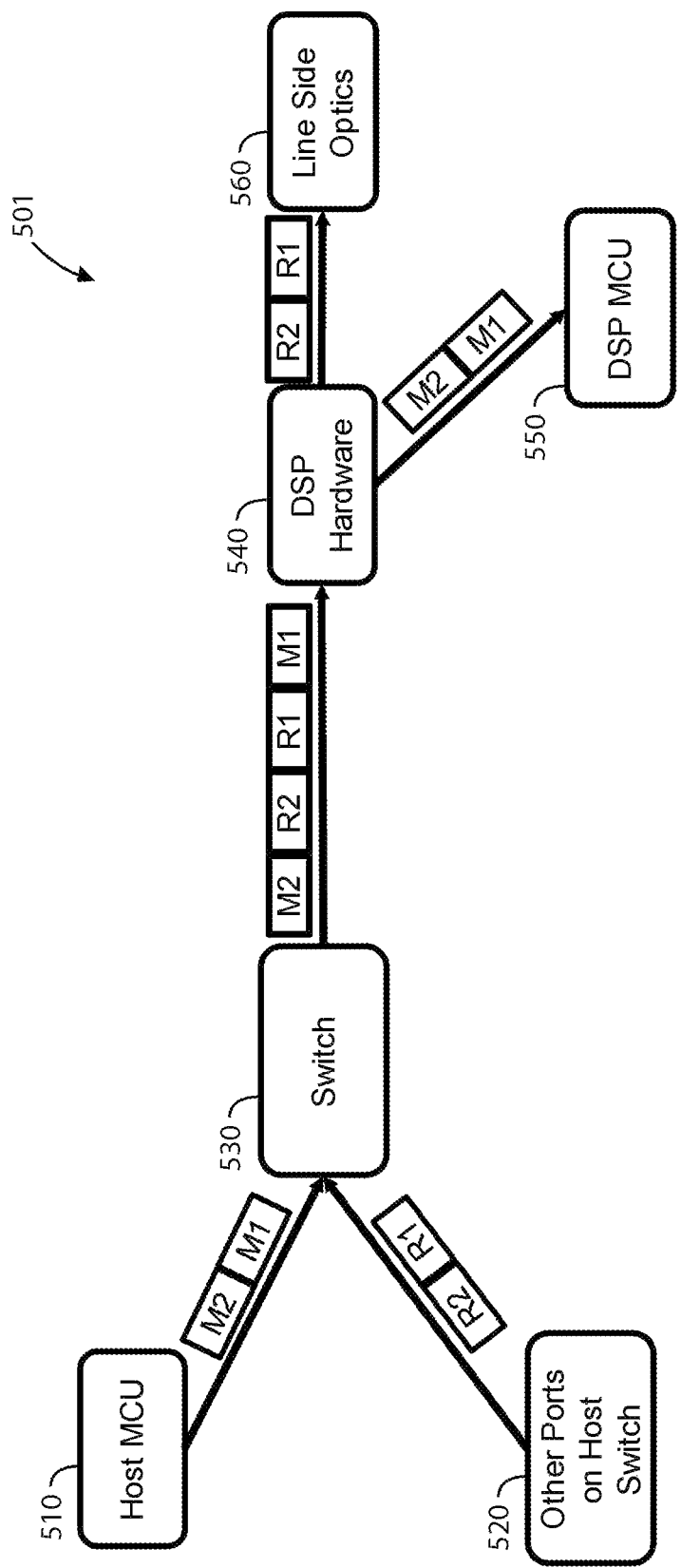
FIG. 5A is a simplified flow diagram illustrating host-to-DSP data packet movement in a mission mode configuration according to an example of the present invention.

FIG. 5A is a simplified packet flow diagram illustrating host-to-DSP data packet movement in a mission mode configuration according to an example of the present invention. As shown, the packet flow diagram 501 starts with the host MCU 510 and other ports on the host 520 (e.g., host switch/router). In this example, the host MCU 510 sends two data packets, M1 and M2, to the DSP MCU 550 of the integrated DSP, while two data packets, R1 and R2, travel from the other host switch ports 520 to a remote destination through the line side optics device 560.

Following the flow diagram 501, the data packets from both the host MCU 510 and the other ports 520 travel to the host switch 530 (e.g., switch ASIC shown in FIG. 2). In a specific example, the host switch 530 is configured to implement switch queuing, which allows for packet interleaving if sufficient overall bandwidth is available. The packet interleaving of the data packets from the host MCU 510 and the other ports 520 is shown in flow diagram 501 as the packets move from the host switch 530 to the DSP hardware 540 of the integrated DSP. In this case, the R1 and R2 data packets are interleaved between the M1 and M2 data packets.

Sufficient overall bandwidth may be attained by restricting the effective traffic rate to reserve a portion of the available nominal bandwidth for packet interleaving. In an example, the host and line systems may configure the traffic stream (e.g., Ethernet traffic stream) to utilize a larger-than-normal Inter Packet Gap (IPG), or the like, in order to reserve sufficient bandwidth. In another example, the DSP hardware can generate pause frames (i.e., the pause method) to regulate the traffic streams. Those of ordinary skill in the art will recognize other variations, modifications, and alternatives.

Once the data packets reach the DSP hardware 540, the packets (M1, M2) destined for the DSP MCU 550 are separated from the packets (R1, R2) destined for the remote destination through line side optics device 560. The architecture of the integrated DSP, including the DSP hardware 540 and the DSP MCU 550, can be similar to that shown in device 400 of FIG. 4. Those of ordinary skill in art will recognize other variations, modifications, and alternatives to this packet movement method of operation.

In an example, the present invention provides for a method of operating a communication system for host-to- DSP packet movement. The method includes sending, by a host MCU within a host device, one or more first data packets to a switch device within the host device. The one or more first data packets can be characterized by a datagram. The method also includes sending, by the switch device, the one or more first data packets to a DSP of an integrated DSP within a module device over a high-speed in-band DSP management interface. This interface is configured from a module host-side interface of the module device. Further, the method includes sending, by the DSP, the one or more first data packets to a DSP MCU of the integrated DSP.

In an example, the method can further include receiving, by the switch device, one or more second data packets from at least a port within the host device. The method can also include sending, by the switch device, the one or more second data packet to the DSP of the integrated DSP over the high-speed in-band DSP management interface. And, the method can include sending, by the DSP, the one or more second data packets to a communication device of the module device. Further, the method can include sending, by the communication device, the second plurality of data packets to a remote destination via a communication channel. Further details of the datagrams as discussed below.

Figure 5B:
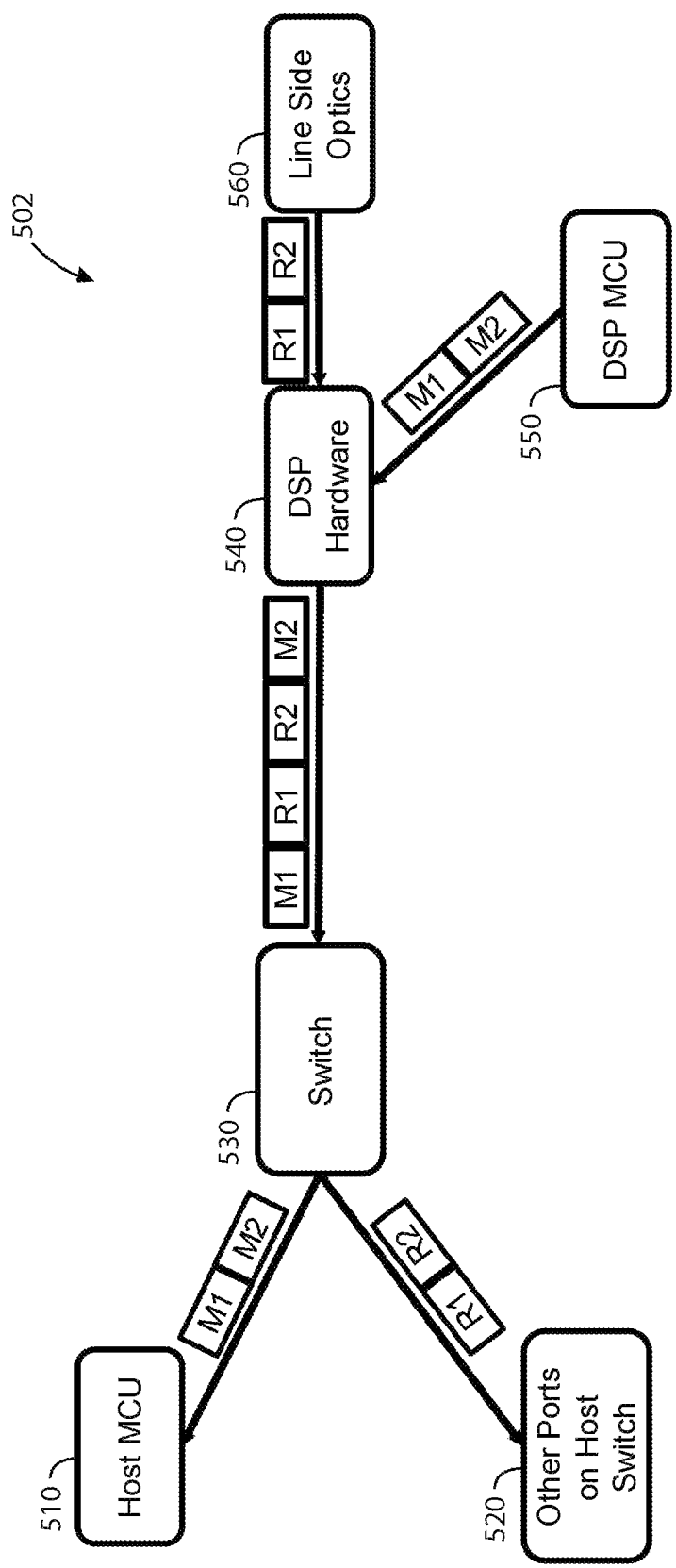
FIG. 5B is a simplified flow diagram illustrating DSP-to-host data packet movement in a mission mode configuration according to an example of the present invention.

FIG. 5B is a simplified packet flow diagram illustrating DSP-to-host data packet movement in a mission mode configuration according to an example of the present invention. The same reference numerals in this flow diagram 502 correspond to the same components shown in flow diagram 501. As shown, the packet flow diagram 502 starts with the line side optics device 560 and the DSP MCU 550 of the integrated DSP. In this example, the line side optics device 560 receives the two data packets, R1 and R2, from a remote destination to be sent to the other ports on the host 520, while the DSP MCU 550 sends two data packets, M1 and M2, to the host MCU 510.

Following flow diagram 502, the data packets from both the line side optics device 560 and the DSP MCU 550 travel to the DSP hardware 540 of the integrated DSP. In a specific example, the DSP hardware 540 of the integrated DSP is configured to use a DSP buffer to implement packet interleaving if sufficient bandwidth is available (e.g., by using methods of traffic restriction discussed previously). In an example, this buffer can be an elastic FIFO. The packet interleaving of the data packets from the line side optics device 560 and the DSP MCU 550 is shown in flow diagram 502 as the packets move from the DSP hardware 540 to the host switch 530. Similar to the case shown in flow diagram 501, the R1 and R2 data packets are interleaved between the M1 and M2 data packets.

Once the data packets reach the host switch 530, the packets (M1, M2) destined for the host MCU 510 are separated from the packets (R1, R2) destined for the other host switch ports 520. As discussed for flow diagram 501, those of ordinary skill in art will recognize other variations, modifications, and alternatives to this packet movement method of operation as well.

In an example, the present invention can provide a method of operating a communication system for DSP-to-host packet movement, which can be configured with the host-to-DSP packet movement method above. The method can include sending, by the DSP MCU of an integrated DSP within the module device, one or more first data packets to a DSP of the integrated DSP. These one or more first data packets can be characterized by a datagram. Also, the method can include sending, by the DSP, the one or more first data packets to the switch device within the host device over the high-speed in-band DSP management interface. Further, the method can include sending, by the switch device, the one or more first data packets to the host MCU within the host device.

The method can further include receiving, by the communication device within the module device, one or more second data packets from a remote destination via a communication channel. The method can also include sending, by the communication device, the one or more second data packets to the DSP of the integrated DSP. Also, the method can include sending, by the DSP, the one or more data packets to the switch device within the host device over the high-speed in-band DSP management interface. Further, the method can include sending, by the switch device, the one or more second data packets to at least a port within the host device. In a specific example, the DSP can interleave the one or more first data packets and the one or more second data packets.

In specific examples of the methods above, at least one of the one or more first data packets and the one or more second data packets can be encapsulated using an Ethernet framing, TCP/IP framing, an SSH protocol, or the like. Or, at least one of these can include a security layer, such as MAC address obfuscation, CRC calculation obfuscation, or the like. Also, the datagram can include one of the following: a write request datagram, a write response datagram, a read request datagram, a read response datagram, a command request datagram, a command response datagram, an encryption key setup request datagram, an encryption key setup response datagram, an encryption status read request datagram, an encryption status read response datagram, or the like.

In an example, the present invention provides a method for operating a communication system for diagnostic streaming. The method includes sending, by the DSP MCU, one or more first data packets to the DSP. The method also includes sending, by the DSP, the one or more first data packets to the communication device using the high-speed in-band DSP management interface configured from a module line-side interface of the module device. Further, the method includes sending, by the communication device, the one or more first data packets to a diagnostics platform over the communication channel. In a specific example, the one or more first data packets are characterized by a diagnostic stream datagram.

In a specific example, sending the one or more first data packets to the diagnostics platform includes sending, by the communication device, the one or more first data packets to a diagnostics communication device of the diagnostics platform. This step also includes sending, by the diagnostics communication device, the one or more first data packets to a diagnostics DSP of the diagnostics platform. Also, this step includes sending, by the diagnostics DSP, the one or more first data packets to a diagnostics field programmable gate array (FPGA) of the diagnostics platform, the diagnostics FPGA being configured by a diagnostics software. Further, this step includes sending, by the diagnostics FPGA, the one or more first data packets to a computing device running a diagnostics software.

The method can further include receiving, by the communication device, one or more second data packets from the diagnostics platform over the communication channel. In a specific example, the one or more second data packets from the diagnostics platform are characterized by diagnostic control datagram. The method can also include sending, by the communication device, the one or more second data packets to the DSP using the high-speed in-band DSP management interface. Further, the method can include sending, by the DSP, the one or more second data packets to the DSP MCU.

In a specific example, receiving the one or more second data packets from the diagnostics platform includes sending, by the computing device running the diagnostics software, the one or more second data packets to the diagnostics FPGA. This step also includes sending, by the diagnostics FPGA, the one or more second data packets to the diagnostics DSP. Also, this step includes sending, by the diagnostics DSP, the one or more second data packets to the diagnostics communication device. Further, this step includes sending, by the diagnostics communication device, the one or more second data packets to the communication device of the module device over the communication channel. Of course, there can be variations, modifications, and alternatives.

Many benefits are recognized through various embodiments of the present invention. Such benefits include the system/device architecture and method of operation for the improved high-speed data communications interface for DSP management, as shown in FIGS. 2 to 6. This high-speed data communications interface can be used for firmware upgrades, management data, diagnostic/telemetry streaming, encryption key programming, and others.

As discussed previously, the DSP MCU of the integrated DSP provided in integrated DSP of the improved communication system architecture can be used for firmware upgrades. Currently, DSP firmware images can be greater than 2 MB. Over prior interfaces (e.g., I2C or MDIO), the transfer time for such images typically take several minutes or even tens of minutes. However, using the high-speed module host or line interface, the transfer time can be reduced to seconds.

The high-speed interface can be used for management data flow as well. High-end DSPs typically provide features like constellation pull, debug log memory, histogram, etc. These features are data-intensive applications that can be dramatically sped up using the high-speed interface. Further, periodic polling of the module by the host can be dramatically sped up as well.

Also, the high-speed interface can be used for diagnostic/telemetry streaming. The internal memory of the integrated DSP can be sent to an external host for offline diagnostic processing. As shown in FIG. 3, a diagnostics platform can be configured to the line side interface of the optical module, and the DSP MCUs can communicate diagnostic information using this line side interface. Telemetry data from the DSP can also be sent to an external host for diagnostic processing as well.

Further, the high-speed interface can be used for encryption key programming. An encryption use example case is discussed later with respect to FIGS. 9A to 9D. Other benefits and applications will certainly be recognized by those of ordinary skill in the art.

The present invention also provides for various protocols of data packet encapsulation for use with the high-speed interface as discussed previously. The data packets can be encapsulated using framing from Ethernet, TCP/IP, or other higher-level protocols and the like. In the Ethernet framing example, the data packets can use an Ethernet addressing scheme. In a specific example, the packet encapsulation can be an Ethernet II framing with a dedicated EtherType. In the TCP/IP framing example, the data packets can use an IPV4/IPV6 addressing scheme with a dedicated port number. Or, the addressing can be provided a TELNET service, or the like, to request a dynamic port number.

Also, SSH or other higher-level protocols can also be used for enhanced security. Other security features can include MAC address obfuscation or different addressing schemes. The CRC calculation can also be obfuscated, and different formulas can be used for different levels of access. Of course, there can be other variations, modifications, and alternatives to these framing and security protocols. Further, regardless of the encapsulation method and/or security features used, the datagram messages can remain the same.

FIG. 6 is a table representing an Ethernet-II packet encapsulation according to an example of the present invention. As shown in table 600, the packet encapsulation can be defined by field names and descriptions associated with certain byte number ranges in an example Ethernet-II packet. In a specific example, the EtherType can be a proprietary EtherType compatible with the 802.3 protocol. However, those of ordinary skill in the art will recognize other variations, modifications, and alternatives to this packet encapsulation example.

In an example, the present invention provides for an example protocol based on a QSFP-DD CMIS I2C protocol. This example protocol assumes a non-guaranteed transmission (e.g., Ethernet or IPG) rather than a guaranteed transmission (e.g., TCIP/IP). By using this protocol, any CMIS-based management can be accomplished, including the CDB (block command) mechanism. FIGS. 7A to 7F show six datagram definitions that can be used under this example protocol. These datagrams can be defined by field names and descriptions associated with certain byte number ranges in an example data packet, as further discussed below.

FIG. 7A is a table representing a write request datagram according to an example of the present invention. This datagram of table 701 is sent from the host to the DSP to send data to the DSP. FIG. 7B is a table representing a write response datagram according to an example of the present invention. This datagram of table 702 is sent from the DSP to the host to respond that the DSP received the data from the write request.

Figure 7D:
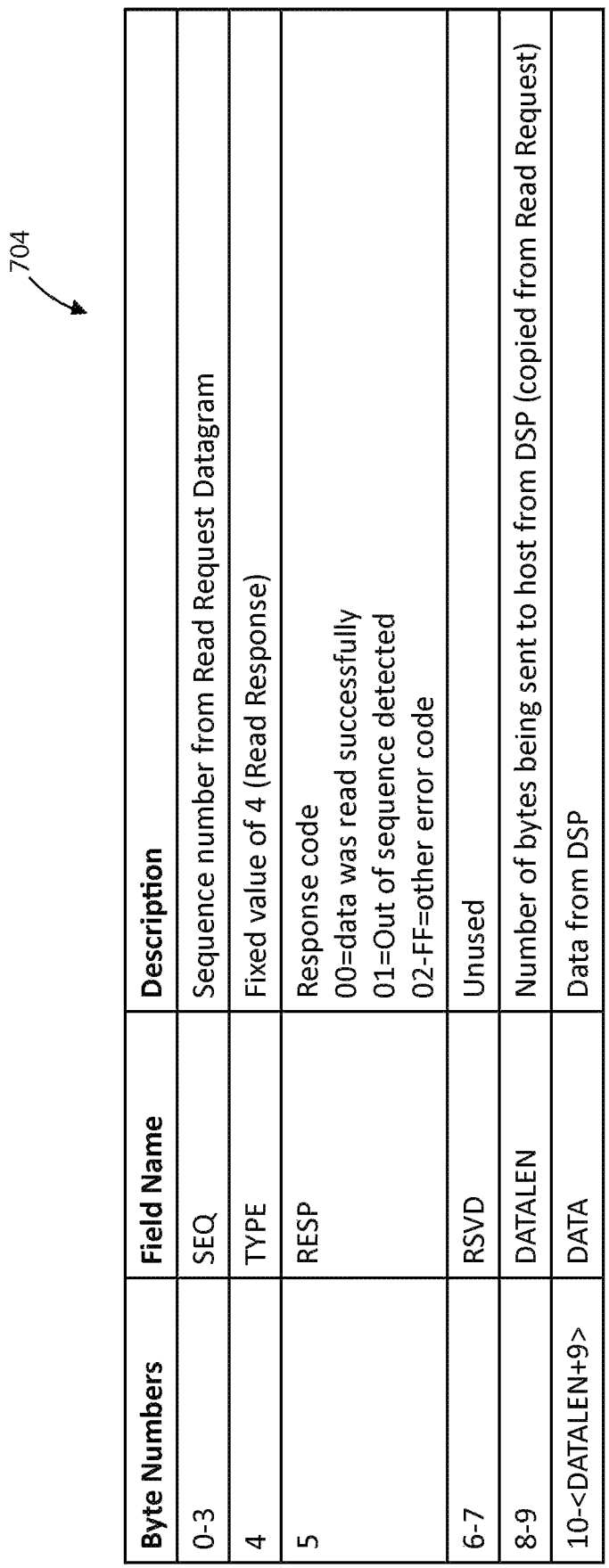

FIG. 7C is a table representing a read request datagram according to an example of the present invention. This datagram of table 703 is sent from the host to the DSP to request data to be read from the DSP. FIG. 7D is a table representing a read response datagram according to an example of the present invention. This datagram of table 704 is sent from the DSP to the host to transfer the requested data from a read request.

FIG. 7E is a table representing a command request datagram according to an example of the present invention. This datagram of table 705 is sent from the host to the DSP to execute a command (e.g., CDB command or the like). FIG. 7F is a table representing a command response datagram according to an example of the present invention. This datagram of table 706 is sent from the DSP to the host to return a response to the command datagram (e.g., CDB response or the like).

Of course, there can be other protocol implementations and datagram definitions. For example, command/response protocols can also be implemented similarly to the 300-pin MSA I2C interface. Any of the datagram fields can be removed, reordered, expanded, or shortened. Different fields may also be added depending on the specific application. All such variations, modifications, and alternatives will be recognized by those of ordinary skill in the art.

In an example, the present invention provides for an example protocol for line-side debugging. In this case, a DSP API command can be sent to place the DSP into a 'line-side debugging mode' (e.g., similar to enabling a PRBS generator/checker). This command may involve disconnecting the host interface from the line-side interface and allowing a line-side debugging system to take over (e.g., "take-over" mode shown in FIG. 3). In another example, the line-side debugging system may operate concurrently with the host-side management controller. In this case, the host controller may selectively configure any number of control and/or debug features to be accessible from the line-side system, while retaining any number of control/debug features to be accessible only from the host controller. As a security measure, the host may revoke/modify any such permissions at any time. Of course, those of ordinary skill in the art will recognize other variations, modifications, and alternatives to the debugging configuration discussed above.

Figure 8A:
FIG. 8A is a table representing a diagnostic control datagram according to an example of the present invention.

FIGS. 8A and 8B show two datagram definitions that can be used under this example protocol. Each of these datagrams can be preconfigured on request and then streamed by hardware. Like FIGS. 7A to 7F, these datagrams can be defined by field names and descriptions associated with certain byte number ranges in an example data packet, as further discussed below.

FIG. 8A is a table representing a diagnostic control datagram according to an example of the present invention. The datagram of table 801 is sent from an external diagnostic controller to set up the diagnostic streaming process. FIG. 8B is a table representing a diagnostic stream datagram according to an example of the present invention. The datagram of table 802 is sent continuously from the DSP under test with pre-configured content. In a specific example, the pre-configured content can include a test block of data that is larger than a packet size. Subsequence (SSEQ) numbering can be used to distinguish partial block data depending on how many datagrams are required (e.g., if three datagrams are required for a block, then groups of datagrams for a block can be assigned SSEQ 1-3). The diagnostic host can then reconstruct the whole block out of partial data received via multiple individual diagnostic stream datagrams according to the sub-sequence numbering. Of course, there can be other variations, modifications, and alternatives.

As mentioned previously, the present invention provides for example use cases of encryption that require high bandwidth or low latency access to the DSP. The present in-band DSP management interface can be highly effective in such encryption use cases. In a specific example, can use the same structure as the CDB request and response datagrams (from FIGS. 7E and 7F) to perform the key setup and statistics reading functions, as shown in FIGS. 9A to 9D.

FIG. 9A is a table representing a key setup request datagram according to an example of the present invention. The datagram of table 901 can be used by the host to send a new key (or list of keys) to the DSP. FIG. 9B is a table representing a key setup response datagram according to an example of the present invention. The datagram of table 902 is sent by the DSP to the host to acknowledge the key setup request.

FIG. 9C is a table representing a statistics read request datagram according to an example of the present invention. The datagram of table 903 can be used by the host to request to read a batch of statistics from an encryption engine. FIG. 9D is a table representing a statistics read response datagram according to an example of the present invention. The datagram of table 904 is sent by the DSP to the host to return the requested statistics. As with the other datagram examples, there can be other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A communication system comprising:
   a module device comprising a digital signal processor (DSP) and a DSP microcontroller unit (MCU) coupled to and integrated into the DSP;
   a host-side interface of the module device, the host-side interface configured to interface the DSP MCU to a host MCU of a host device; and
   a line-side interface of the module device, the line-side interface configured as a high-speed in-band DSP management interface configured to interface the DSP MCU to a communication device, the DSP MCU configured to stream data via the communication device over an optical communication channel using the high-speed in-band DSP management interface while bypassing the host MCU of the host device.

2. The communication system of claim 1 wherein the DSP and the DSP MCU are integrated into the module device.

3. The communication system of claim 1 wherein the DSP of the module device is configured to receive firmware from the host MCU of the host device via the host-side interface of the module device and wherein the DSP MCU of the module device is configured to install the firmware in the module device.

4. The communication system of claim 1 wherein the DSP MCU of the module device is configured to communicate diagnostic information from the module device to a diagnostic system over the optical communication channel via the line-side interface of the module device.

5. The communication system of claim 1 wherein the DSP of the module device is configured to communicate telemetry data from the module device to a diagnostic system over the optical communication channel via the line-side interface of the module device.

6. The communication system of claim 1 wherein the DSP of the module device is configured to disable the host-side interface of the module device and to communicate with a debugging system via the line-side interface of the module device.

7. The communication system of claim 1 wherein the DSP of the module device is configured to communicate with a debugging system via the line-side interface of the module device and to control access of the debugging system to debug features based on a command received from the host MCU of the host device via the host-side interface of the module device.

8. The communication system of claim 1 wherein the DSP MCU of the module device is configured to communicate with the host MCU of the host device through a switch device, the switch device coupled to the module device by the host-side interface.

9. The communication system of claim 1 wherein the host-side interface is also configured as a high-speed in-band DSP management interface.

10. The communication system of claim 1 wherein the module device is configured to perform firmware upgrade, diagnostic/telemetry streaming, and management operations using the high-speed in-band DSP management interface.

11. The communication system of claim 1 wherein the DSP MCU of the module device and the host MCU of the host device are configured to communicate management data via the host-side interface.

12. The communication system of claim 1 wherein the DSP of the module device comprises a MAC client configured to communicate via the high-speed in-band DSP management interface.

13. The communication system of claim 1 wherein the communication device comprises an optical device, a wireless device, a baseband device, or a transceiver.

* * * * *